Figure 1:
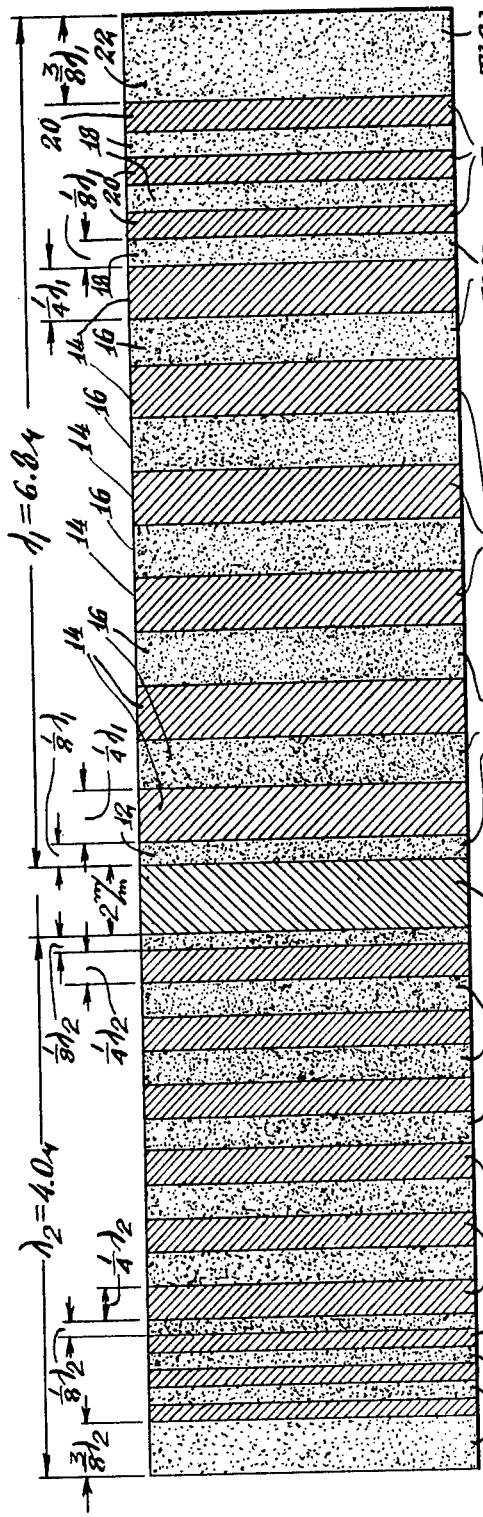

Sept. 29, 1964 N. L. ALPERT 3,151,208
INFRARED INTERFERENCE FILTERS
Filed Jan. 23, 1961

INVENTOR.
Nelson L. Alpert
BY
Gerald E. Bramblett Jr.
ATTORNEY.

United States Patent Office 3,151,208
Patented Sept. 29, 1964

3,151,208
INFRARED INTERFERENCE FILTERS
Nelson L. Alpert, Stamford, Conn., assignor to The Perkin-Elmer Corporation, Norwalk, Conn., a corporation of New York
Filed Jan. 23, 1961, Ser. No. 84,212
1 Claim. (Cl. 88—106)

This invention relates to improved interference filters for use in the longer wavelength infrared regions.

Interference filters are well known and widely used devices for passing selected radiation wavelengths and simultaneously reflecting undesirable wavelengths. Essentiallys, such filters consist of alternating layers of a material having a relatively high index of refraction and a material having a low index of refraction. By making the layers of the proper thickness, the reflections of certain wavelengths from the boundaries between the materials are reinforced and thereby removed from the transmitted beam. The other wavelengths pass through the material.

A comprehensive treatment of interference filters generally, for both the visible and infrared regions, will be found in Optical Properties of Thin Solid Films by O. S. Heavens, published in London by Butterworths Scientific Publications, 1955. Although the general theory of interference filters is well known and understood, great practical difficulties have been encountered in attempting to design such filters having practical applications at wavelengths beyond $8\mu$ and out to at least wavelengths of $15\mu$. These problems have been especially acute with respect to the low index material. It is important that such a material have relatively low absorbance throughout the desired wavelength range. It is also desirable that the index of refraction of the material remain relatively constant throughout this range. A complicating factor has been that, of the otherwise suitable materials heretofore used, most have been either hygroscopic, water-soluble, or have had too high melting points.

Although it is true that hygroscopic or water-soluble materials may often be employed in laboratory-type spectrophotometers, it will be apparent that their use is severely limited. For example, the instruments must be maintained in carefully controlled atmospheres and may need to be installed in cabinets capable of being filled with suitable dry gases or gas mixtures. This property, of course, essentially rules out the use of such materials in process-type instruments or in other than strict laboratory applications.

Furthermore, it has been found quite difficult to manufacture interference filters with materials presently employed. One reason for this is that the melting points of the materials are often quite high. When such a material is evaporated onto the surface of a filter substrate, it may reach a very high temperature. Subsequent cooling may then cause the extremely thin layers of deposited material to flake off or mechanically deform.

It is, therefore, the primary object of the present invention to provide an interference filter having optical properties suitable for use in the infrared region.

It is another object of this invention to provide such a filter which is non-hygroscopic.

It is another object of this invention to provide such a filter utilizing materials which are relatively water-insoluble.

It is another object of this invention to provide such a filter utilizing materials having relatively low melting points.

Figure 2:
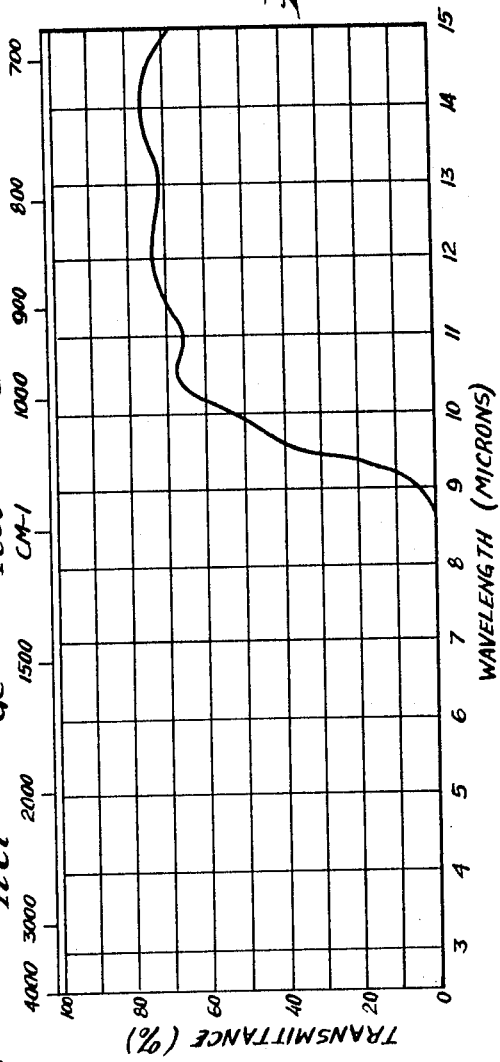

Other objects, features and advantages of this invention will be apparent from the following description, the appended claim, and the two figures of the attached sheet of drawing wherein:

FIG. 1 is a cross-section of a filter constructed in accordance with the invention, the thickness of the layers being greatly exaggerated for purposes of illustration; and FIG. 2 is a transmittance curve obtained from the filter of FIG. 1.

In accordance with this invention, an interference transmittance filter for use in the infrared is constructed having an infrared permeable substrate and alternating layers of thallium halide and a material having a higher index of refraction.

I have discovered that the halides of thallium are uniquely suited for use as the low index material in interference filters. These materials are essentially insoluble in water, are non-hygroscopic, have melting temperatures in the neighborhood of 400° C.–500° C. and exhibit suitable transmittance out to beyond $20\mu$.

Thallium chloride, for example, has a melting point of 430° C., a solubility of 0.32 gm./100 gm. water at 20° C., and optical transmittance of approximately 80% throughout almost the same wavelength range as potassium bromide. Furthermore, thallium chloride has a relatively constant index of refraction throughout this range.

As an example of this invention, an optical filter was constructed as illustrated in FIG. 1. A rectangular germanium plate 10, having a thickness of 2 mm., was used as the substrate. It was desired to construct a filter which would transmit essentially from $10\mu$ to beyond $15\mu$ while rejecting wavelengths shorter than $9\mu$. The germanium substrate was characterized by acceptable transmittance throughout this range.

On one side of the germanium was deposited a layer of thallium chloride 12, having a thickness of $\frac{1}{8}\lambda_1$ where $\lambda_1 = 6.8\mu$. On top of this was deposited a layer 14 of tellurium having a thickness of $\frac{1}{4}\lambda_1$. Alternating $\frac{1}{4}\lambda_1$ layers of thallium chloride 16 and tellurium 14 were applied for a total of 11 layers. On the surface of the last such layer was applied a series of 6 alternating layers of thallium chloride 18 and tellurium 20, each having a thickness of $\frac{1}{8}\lambda_1$. The outer surface of this side of the filter was then formed by depositing a layer of thallium chloride 22 having a thickness of $\frac{3}{8}\lambda_1$.

By depositing a series of layers of $\frac{1}{4}\lambda_1$ thickness where $\lambda_1 = 6.8\mu$, a filter is formed which has good transmittance above approximately $10\mu$ and a reflectance band centered at about $6.8\mu$. However, such a filter is characterized by an undesirable transmittance band which extends from about 3 to $5.5\mu$. In order to dispose of this band, $\frac{1}{4}\lambda$ layers based on a wavelength of $\lambda = 4.0\mu$ are deposited on the opposite side of the germanium. These layers form a second filter having good transmittance above about $6\mu$ which does not interfere with the transmittance of the first filter above $10\mu$. This filter also has a narrow transmittance band centered at $2.0\mu$. As these two filters form a series path for radiation, the effect is to cancel out both narrow bands thus forming a single long pass filter rejecting all wavelengths shorter than about $9\mu$. The greater the number of layers, the sharper the cutoff. The outer layers of $\frac{1}{8}\lambda$ and $\frac{3}{8}\lambda$ are added to reduce the "ripple" in the transmittance curve which is the natural result of a periodic stack.

It is to be understood that the foregoing description is illustrative rather than limiting. While the specifically described examples have disclosed the use of tellurium as the high index material, the invention is not so limited. Other suitable high index materials, such as germanium and lead telluride, may also be used in filters constructed in accordance herewith. This invention is to be construed as limited only by the scope of the following claim.

I claim:

An interference transmittance filter for use in the infrared having a germanium substrate wherein a first side of said germanium substrate is coated with a layer of thallium chloride having a thickness substantially equal to 1/8 of a first wavelength to be reflected, a plurality of alternating layers of tellurium and thallium chloride having thicknesses substantially equal to 1/4 of said first wavelength, a plurality of alternating layers of tellurium and thallium chloride having thicknesses substantially equal to 1/8 of said first wavelength, and a thallium chloride surface layer of a thickness substantially equal to 3/8 of said first wavelength; wherein an opposite second side of said substrate is coated with a layer of thallium chloride having a thickness substantially equal to 1/8 of a second wavelength to be reflected, a plurality of alternating layers of tellurium and thallium chloride having thicknesses substantially equal to 1/4 of said second wavelength, a plurality of alternating layers of tellurium and thallium chloride having thicknesses substantially equal to 1/8 of said second wavelength, and a thallium chloride surface layer of a thickness substantially equal to 3/8 of said second wavelength and wherein the outermost layer of each plurality of alternating layers is tellurium.

References Cited in the file of this patent

UNITED STATES PATENTS 2,852,980    Schroder _____ Sept. 23, 1958

OTHER REFERENCES

Heavens: Optical Properties of Thin Solid Films, textbook, published 1955 in London, England, pp. 217, 229 and 230 cited.

Braithwaite: Article in Journal of Scientific Instruments, vol. 32, January 1955, pp. 10 and 11 cited.